United States Patent
Moon et al.

(10) Patent No.: US 11,183,717 B2
(45) Date of Patent: Nov. 23, 2021

(54) POUCH-SHAPED SECONDARY BATTERY INCLUDING HEAT TRANSFER MEMBER CONNECTED TO METAL LAYER OF LAMINATE SHEET

(71) Applicant: LG Chem, Ltd., Seoul (KR)

(72) Inventors: Jae Won Moon, Daejeon (KR); Hyung Seok Han, Daejeon (KR); Hyung Kyun Yu, Daejeon (KR); Ki Hoon Paeng, Daejeon (KR)

(73) Assignee: LG Chem, Ltd.

( * ) Notice: Subject to any disclaimer, the term of this patent is extended or adjusted under 35 U.S.C. 154(b) by 154 days.

(21) Appl. No.: 16/473,452

(22) PCT Filed: Aug. 23, 2018

(86) PCT No.: PCT/KR2018/009752
§ 371 (c)(1),
(2) Date: Jun. 25, 2019

(87) PCT Pub. No.: WO2019/045365
PCT Pub. Date: Mar. 7, 2019

(65) Prior Publication Data
US 2019/0334219 A1 Oct. 31, 2019

(30) Foreign Application Priority Data

Aug. 29, 2017 (KR) .................. 10-2017-0109714
Aug. 21, 2018 (KR) .................. 10-2018-0097286

(51) Int. Cl.
*H01M 10/655* (2014.01)
*H01M 10/613* (2014.01)
(Continued)

(52) U.S. Cl.
CPC ....... *H01M 10/655* (2015.04); *H01M 10/613* (2015.04); *H01M 10/647* (2015.04); *H01M 10/653* (2015.04); *H01M 50/124* (2021.01)

(58) Field of Classification Search
CPC ............. H01M 10/655; H01M 10/613; H01M 10/647; H01M 10/653; H01M 50/124
(Continued)

(56) References Cited

U.S. PATENT DOCUMENTS

2007/0269714 A1    11/2007  Watanabe et al.
2012/0021270 A1*   1/2012  Kumar ............... H01M 10/613
                                                          429/120
(Continued)

FOREIGN PATENT DOCUMENTS

JP    11288737 A   * 10/1999
JP    H11288737 A    10/1999
(Continued)

OTHER PUBLICATIONS

Search report from International Application No. PCT/KR2018/009752, dated Nov. 28, 2018.
(Continued)

*Primary Examiner* — Sean P Cullen
(74) *Attorney, Agent, or Firm* — Lerner, David, Littenberg, Krumholz & Mentlik, LLP

(57) ABSTRACT

Disclosed herein is a pouch-shaped secondary battery including a laminate sheet including an outer coating layer, a metal layer, and an inner adhesive layer, an electrode assembly, an electrolytic solution, and a heat transfer member connecting the electrode assembly to the metal layer of the laminate sheet, wherein the laminate sheet extends around the electrode assembly, the electrolytic solution, and the heat transfer member.

11 Claims, 3 Drawing Sheets

(51) Int. Cl.
*H01M 10/653* (2014.01)
*H01M 10/647* (2014.01)
*H01M 50/124* (2021.01)

(58) Field of Classification Search
USPC .................................................. 429/120, 163
See application file for complete search history.

(56) References Cited

U.S. PATENT DOCUMENTS

| | | | |
|---|---|---|---|
| 2012/0231313 A1* | 9/2012 | Kumar | H01M 10/6551 |
| | | | 429/120 |
| 2013/0164594 A1 | 6/2013 | Zahn | |
| 2017/0187073 A1* | 6/2017 | Kim | H01M 10/0587 |
| 2017/0294693 A1 | 10/2017 | Tong et al. | |

FOREIGN PATENT DOCUMENTS

| | | |
|---|---|---|
| JP | 2000030975 A | 1/2000 |
| JP | 2007066806 A | 3/2007 |
| JP | 2007311264 A | 11/2007 |
| KR | 20080019311 A | 3/2008 |
| KR | 20110007331 A | 1/2011 |
| KR | 20140059650 A | 5/2014 |
| KR | 101520168 B1 | 5/2015 |
| KR | 20160040167 A | 4/2016 |
| KR | 20160041256 A | 4/2016 |
| KR | 20160106266 A | 9/2016 |
| KR | 101697764 B1 | 1/2017 |
| KR | 20170052059 A | 5/2017 |
| KR | 20170057465 A | 5/2017 |

OTHER PUBLICATIONS

Extended European Search Report including the Written Opinion for Application No. 18852100.9 dated Feb. 13, 2020, 8 pages.

* cited by examiner

POUCH-SHAPED SECONDARY BATTERY INCLUDING HEAT TRANSFER MEMBER CONNECTED TO METAL LAYER OF LAMINATE SHEET

CROSS-REFERENCE TO RELATED APPLICATIONS

This application is a national phase entry under 35 U.S.C. § 371 of International Patent Application No. PCT/KR2018/009752, filed on Aug. 23, 2018, published in Korean, which claims the benefit of the filing date of Korean Patent Application Nos. 10-2017-0109714, filed on Aug. 29, 2017, and 10-2018-0097286, filed on Aug. 21, 2018, the disclosures of all of which are hereby incorporated herein by reference in their entireties.

TECHNICAL FIELD

The present invention relates to a pouch-shaped secondary battery including a heat transfer member, and more particularly to a pouch-shaped secondary battery including a heat transfer member for connecting an electrode assembly to a metal layer of a laminate sheet in order to improve the heat dissipation efficiency of the secondary battery without using an additional cooling member in the case in which a battery case made of a laminate sheet is used.

BACKGROUND ART

Secondary batteries, which can be charged and discharged, have attracted considerable attention as power sources for devices that require high output and large capacity, including an electric vehicle (EV), a hybrid electric vehicle (HEV), and a plug-in hybrid electric vehicle (Plug-In HEV), which have been proposed to solve problems, such as air pollution, caused by existing gasoline and diesel vehicles using fossil fuels.

Based on the shape thereof, the secondary batteries may be classified into a cylindrical battery cell, a prismatic battery cell, and a pouch-shaped battery cell. Among these kinds of battery cells, much interest is currently focused on the pouch-shaped battery cell, which can be stacked with high integration, has high energy density per unit weight, can be manufactured at low cost, and can be easily modified.

The pouch-shaped battery cell is a battery cell including a battery case made of a laminate sheet, and is configured to have a structure in which an electrode assembly is mounted in the battery case.

One of the principal research projects for a pouch-shaped battery, the outer surface of which is generally soft, is to improve the safety of the pouch-shaped battery. A lithium secondary battery may explode due to high temperature and pressure in the secondary battery, which may be caused by an abnormal state of the secondary battery, such as a short circuit in the secondary battery, overcharge of the secondary battery with higher than an allowed current or voltage, exposure of the secondary battery to high temperatures, or deformation of the secondary battery due to being dropped or having an external impact applied thereto.

In connection therewith, a method of increasing thermal capacity using a thick current collector may be used. In this case, however, the overall thickness of an electrode assembly is increased as the result of an increase in the thickness of the current collector, whereby it is difficult to design a high-capacity battery cell. Alternatively, a method of preventing an increase in temperature through the provision of an additional cooling pipe or module in a pouch-shaped battery case may be used. In this case, however, costs related to the introduction of a new cooling system are increased, and it is necessary to redesign the battery in terms of the position at which the cooling system is mounted and arrangement of the cooling system depending on the size of the cooling system.

Meanwhile, a method of interrupting the flow of current may be used in the state in which the operation of the secondary battery is abnormal. In the case in which the temperature of the secondary battery exceeds the critical point thereof, however, it is difficult to prevent the secondary battery from catching fire or exploding.

Korean Registered Patent No. 1697764 discloses a polymer composite material including a graphite body and at least one selected from the group consisting of a low-viscosity monomer, oligomer, and resin, with which the graphite body is impregnated, and a combination thereof.

Although the above patent discloses a material that exhibits high heat dissipation efficiency, this patent does not suggest application of the material to a pouch-shaped secondary battery. Furthermore, the polymer composite material may react with an electrolytic solution in a battery case.

As other examples of the conventional art, Korean Patent Application Publication No. 2016-0040167 discloses a battery pack including a connection member, to which different kinds of metals having different melting points are coupled, Korean Registered Patent No. 1520168 discloses a lithium secondary battery including clad-structured electrode leads having different thicknesses, and Japanese Patent Application Publication No. 2000-030975 discloses a cooling member configured to have a structure in which a heat dissipation member is connected to the core of a metal-based composite material having a filler, such as ceramic particles or ceramic fiber, dispersed in a metal, which is a matrix. However, these publications do not suggest a method of improving the heat dissipation efficiency of a pouch-shaped secondary battery.

Therefore, there is an urgent necessity for technology that is capable of rapidly discharging heat from a secondary battery without attaching an additional device to the outside of the secondary battery while minimizing an increase in the thickness of a battery cell, thereby improving the safety of the secondary battery.

DISCLOSURE

Technical Problem

The present invention has been made in view of the above problems and other technical problems that have yet to be resolved, and it is an object of the present invention to provide a pouch-shaped secondary battery including a battery case made of a laminate sheet including a metal layer and a resin layer, wherein a heat transfer member is provided in order to connect an electrode assembly to a metal layer of the laminate sheet, whereby heat generated from the electrode assembly is rapidly discharged toward the laminate sheet via the heat transfer member and thus the heat dissipation efficiency of the pouch-shaped secondary battery is improved.

It is another object of the present invention to provide a secondary battery configured to have a structure that is capable of rapidly discharging heat generated from the secondary battery during normal use of the secondary battery, such as charging and discharging thereof, to the outside, whereby the lifespan of the secondary battery is increased, and configured to have a structure that is capable of preventing the occurrence of a high temperature phenomenon due to abnormal use of the secondary battery, whereby the secondary battery is prevented from catching fire or exploding and thus the safety of the secondary battery is improved.

Technical Solution

In accordance with an aspect of the present invention, the above and other objects can be accomplished by the provision of a pouch-shaped secondary battery including a laminate sheet including an outer coating layer, a metal layer, and an inner adhesive layer, an electrode assembly, an electrolytic solution, and a heat transfer member connecting the electrode assembly to the metal layer of the laminate sheet, wherein the laminate sheet extends around the electrode assembly, the electrolytic solution, and the heat transfer member.

That is, the pouch-shaped secondary battery is configured to have a structure in which the heat transfer member is located between the electrode assembly and the laminate sheet, which constitutes a battery case, such that the heat transfer member connects the electrode assembly to the metal layer of the laminate sheet. Consequently, it is possible to rapidly discharge thermal energy generated from the electrode assembly to the outside via the metal layer of the laminate sheet.

The pouch-shaped secondary battery according to the present invention uses an electrode current collector that has a general thickness. Consequently, it is possible to solve a problem in which the overall thickness of the electrode assembly is increased as the result of using a thick metal plate as an electrode current collector in the conventional art. In addition, since the heat transfer member is located between the electrode assembly, which is mounted in the battery case, and the battery case, it is possible to reduce the overall size of the secondary battery compared to the case in which an additional cooling member is attached to the outside of the battery case. Consequently, it is possible to apply the secondary battery to a small-sized device and to reduce costs related to the addition of a cooling member.

In a concrete example, the heat transfer member is configured to have a structure that is capable of connecting the electrode assembly to the metal layer of the laminate sheet. Even in the case in which the laminate sheet and the electrode assembly are arranged so as to be in tight contact with each other in the state in which the heat transfer member is interposed between the laminate sheet and the electrode assembly, therefore, the electrode assembly is not directly connected to the metal layer of the laminate sheet, since the inner adhesive layer of the laminate sheet is located between the metal layer of the laminate sheet and the electrode assembly.

In order to directly connect the electrode assembly to the metal layer of the laminate sheet, therefore, the heat transfer member may be configured to have a protruding structure that extends through the inner adhesive layer of the laminate sheet.

The heat transfer member, which is located between the electrode assembly and the laminate sheet, may be attached to the laminate sheet and contacts an outermost electrode of the electrode assembly.

For example, when the laminate sheet is manufactured, the heat transfer member is located on the outer surface of the inner adhesive layer of the laminate sheet, and lamination is performed. In this case, at least a portion of the heat transfer member may contact the metal layer of the laminate sheet, or the heat transfer member and the laminate sheet may be integrated.

Alternatively, in the case in which the battery case is sealed in the state in which the heat transfer member is located on the surface of the electrode assembly after the electrode assembly is received in the battery case, the height of an electrode assembly reception unit, the height of the electrode assembly, and the height of the heat transfer member may be adjusted such that a portion of the heat transfer member contacts the metal layer. Even in the case in which a portion of the heat transfer member does not contact the metal layer at a sealing step, the heat transfer member may be connected to the metal layer through a degassing process.

In addition, an electrode assembly having a structure in which positive electrodes and negative electrodes are stacked in the state in which separators are interposed respectively between the positive electrodes and the negative electrodes is generally configured such that no electrode active material is applied to the outer surface of the outermost electrode, whereby a surface that is not coated with an electrode active material is located at the outermost side of the electrode assembly. In the case in which the heat transfer member is located between the laminate sheet and the electrode assembly, the heat transfer member may contact the non-coated surface of the outermost electrode of the electrode assembly.

The heat transfer member may include a main body defining a planar surface and a protrusion extending perpendicularly from the planar surface. The flat type main body may be located between the inner adhesive layer of the laminate sheet and the outermost electrode of the electrode assembly, and the protrusion may be configured to have a structure extending through the inner adhesive layer of the laminate sheet.

In a concrete example, the heat transfer member may comprise a protruding structure extending perpendicularly from the outer surface of the outermost electrode of the electrode assembly. The tip of the protruding structure may be connected to the metal layer of the laminate sheet.

The protruding structure may be a structure coupled to the outermost electrode of the electrode assembly. The protruding structure may be a combination of an electrode and a heat transfer member.

Alternatively, the protruding structure may be a structure separable from the outermost electrode of the electrode assembly. The protruding structure may be located so as to be perpendicular to the plane of the outermost electrode and to the metal layer of the laminate sheet. The protruding structure may be a needle or a pole inserted into the inner adhesive layer of the laminate sheet.

The protruding structure may include a plurality of protrusions arranged along a main body of the heat transfer member or along the outer surface of the outermost electrode at uniform intervals. In consideration of efficiency in rapidly moving thermal energy from the electrode assembly toward the laminate sheet, a plurality of protrusions may be formed. In addition, the protrusions may be arranged at uniform intervals such that the thermal energy can uniformly and rapidly move from the entirety of the outer surface of the electrode assembly.

The protruding structure is a structure that extends through the inner adhesive layer of the laminate sheet in order to connect the electrode assembly to the metal layer of the laminate sheet. The height of the protruding structure may be 100% to 120%, preferably 110% to 120%, of the thickness of the inner adhesive layer of the laminate sheet.

In the case in which the height of the protruding structure is less than 100% of the thickness of the inner adhesive layer of the laminate sheet, the electrode assembly is not connected to the metal layer of the laminate sheet, which is undesirable. In the case in which the height of the protruding structure is greater than 120% of the thickness of the inner adhesive layer of the laminate sheet, the distance between the electrode assembly and the laminate sheet is increased, whereby the size of a uselessly wasted space is increased, and besides, the heat dissipation effect is reduced, which is also undesirable.

Specifically, in consideration of the fact that the thickness of the inner adhesive layer of the laminate sheet generally ranges from 20 μm to 100 μm, the protruding structure may have a height ranging from 20 μm to 140 μm, preferably from 22 μm to 120 μm.

In the case in which the height of the protruding structure is less than 20 μm, the electrode assembly is not connected to the metal layer of the laminate sheet, which is undesirable. In the case in which the height of the protruding structure is greater than 120 μm, the distance between the electrode assembly and the laminate sheet is increased, whereby the size of a uselessly wasted space is increased, which is also undesirable.

In consideration of the fact that the outermost electrode of the electrode assembly is configured to contact the inner adhesive layer of the laminate sheet, the electrode assembly may be configured to have a structure in which positive electrodes and negative electrodes are stacked in the state in which separators are interposed respectively between the positive electrodes and the negative electrodes. For example, the electrode assembly may be a stacked type electrode assembly, a stacked/folded type electrode assembly, or a laminated/stacked type electrode assembly. Alternatively, one or more electrode assemblies may be stacked.

Also, in the case in which each of the stacked type electrode assembly, the stacked/folded type electrode assembly, and the laminated/stacked type electrode assembly is used as a unit cell, unit cells having different sizes, with the exception that the planar sizes of the unit cells are the same, may be stacked.

Meanwhile, the pouch-shaped secondary battery according to the present invention is configured to have a structure in which the outermost electrode of the electrode assembly is connected to the metal layer of the battery case. In consideration of the fact that the metal layers of the upper case and the lower case, which constitute the battery case, contact each other when the upper case and the lower case are sealed by thermal fusion, the electrode assembly may be configured such that the outermost electrodes of the electrode assembly are electrodes having the same polarity in order to prevent the occurrence of a short circuit in the secondary battery.

Alternatively, in the case in which only one of the outermost electrodes of the electrode assembly is connected to the metal layer of the battery case, the outermost electrodes of the electrode assembly may be electrodes having different polarities. The heat transfer member is a member for rapidly discharging thermal energy, generated in the battery cell, out of the battery cell. Consequently, the heat transfer member may be made of a metal that exhibits high thermal conductivity.

For example, the heat transfer member may be made of at least one selected from the group consisting of aluminum (Al), copper (Cu), silver (Ag), gold (Au), nickel (Ni), tungsten (W), carbon (C), and iron (Fe). Preferably, the heat transfer member is made of aluminum or copper.

In accordance with another aspect of the present invention, there is provided a battery pack including the pouch-shaped secondary battery.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

The structure and manufacturing method of the device are well known in the art to which the present invention pertains, and thus a detailed description thereof will be omitted.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

Figure 1:
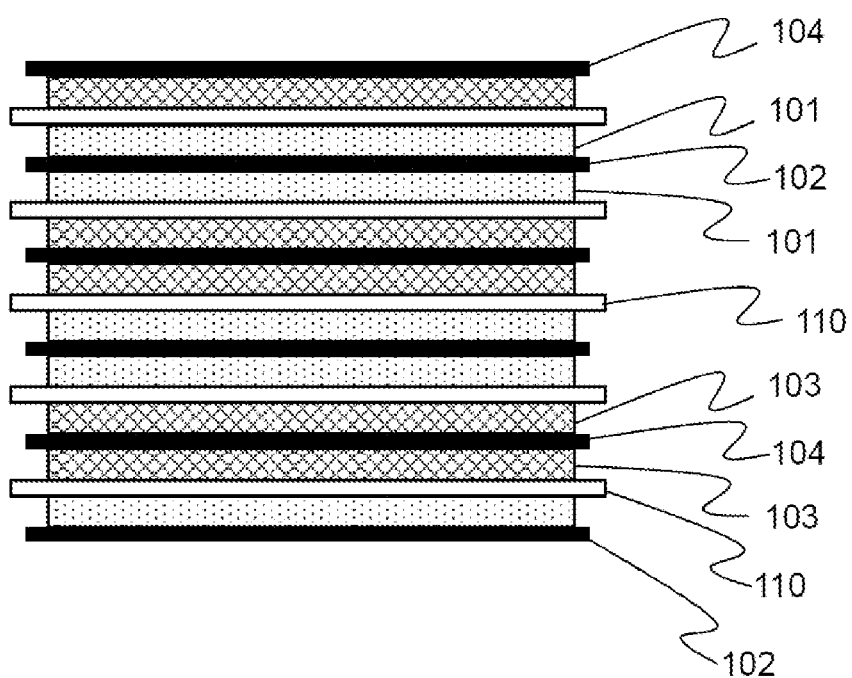
FIG. 1 is a side sectional view showing an electrode assembly according to an embodiment of the present invention.

FIG. 1 is a side sectional view schematically showing an electrode assembly that is used in a pouch-shaped secondary battery according to the present invention.

Referring to FIG. 1, the electrode assembly, denoted by reference numeral 100, is a stacked type electrode assembly configured to have a structure in which positive electrodes, each of which is configured such that a positive electrode active material 101 is coated on one surface or both surfaces of a positive electrode current collector 102, and negative electrodes, each of which is configured such that a negative electrode active material 103 is coated on one surface or both surfaces of a negative electrode current collector 104, are stacked in the state in which separators 110 are interposed respectively between the positive electrodes and the negative electrodes.

The uppermost electrode of the electrode assembly 100 is a negative electrode, and the lowermost electrode of the electrode assembly 100 is a positive electrode. Alternatively, the outermost electrodes of the electrode assembly 100 may be electrodes having the same polarity, for example, positive electrodes or negative electrodes.

The uppermost electrode of the electrode assembly 100 is a single-sided negative electrode, which is configured such that a negative electrode active material 103 is coated only on the inner surface of a negative electrode current collector 104, and the lowermost electrode of the electrode assembly 100 is a single-sided positive electrode, which is configured such that a positive electrode active material 101 is coated only on the inner surface of a positive electrode current collector 102. Electrodes of the electrode assembly 100 other than the outermost electrodes are double-sided electrodes, each of which is configured such that an electrode active material is coated on both surfaces of an electrode current collector.

Since the electrode current collector, which is made of a metal material, is located at the outermost side of the electrode assembly that faces a heat transfer member, as described above, thermal energy from the electrode assembly may rapidly move toward a pouch-shaped battery case via the heat transfer member.

Alternatively, in the case in which non-coated electrodes having no electrode active material coated thereon are used as the outermost electrodes, a laminated/stacked type electrode assembly or a stacked/folded type electrode assembly may be used instead of the stacked type electrode assembly 100.

Figure 2:
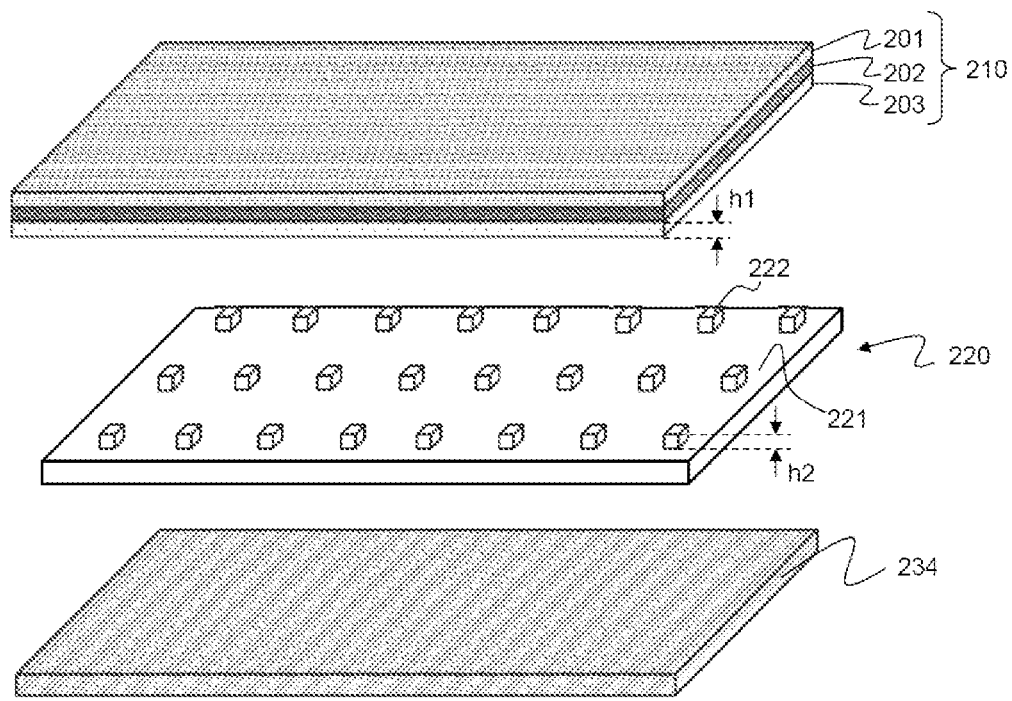
FIG. 2 is a partial exploded perspective view showing a laminate sheet, a heat transfer member, and an electrode according to an embodiment of the present invention.
Figure 3:
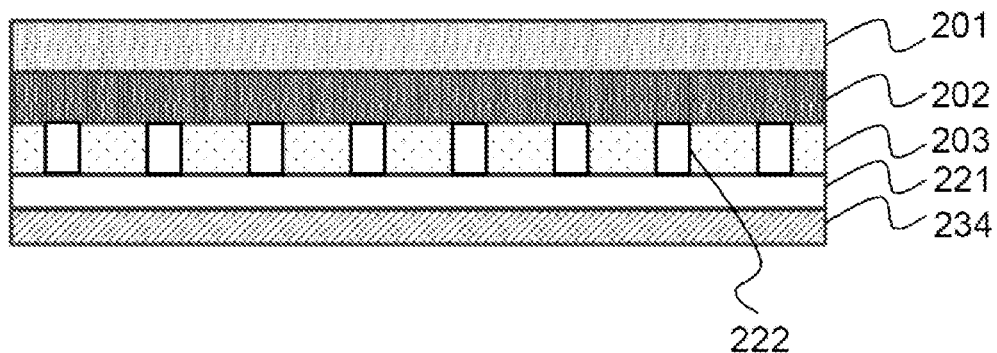
FIG. 3 is a partial side sectional view of the laminate sheet, the heat transfer member, and the electrode shown in FIG. 2.

FIG. 2 is a partial exploded perspective view schematically showing a laminate sheet, a heat transfer member, and an electrode according to an embodiment of the present invention, and FIG. 3 is a side sectional view schematically showing the state in which the laminate sheet, the heat transfer member, and the electrode shown in FIG. 2 are coupled to each other.

Referring to FIGS. 2 and 3, the laminate sheet, denoted by reference numeral 210, is configured to have a layered structure in which an outer coating layer 201, a metal layer 202, and an inner adhesive layer 203 are sequentially stacked. The inner surface of the laminate sheet 210 faces the heat transfer member, denoted by reference numeral 220. A flat type main body 221 of the heat transfer member 220 is located between the inner adhesive layer 203 of the laminate sheet 210 and the electrode, denoted by reference numeral 234. Protrusions 222 of the heat transfer member 220 contact the metal layer 202 of the laminate sheet 210 through the inner adhesive layer 203.

Each of the protrusions 222 is shown as being configured to have a rectangular parallelepiped structure. Alternatively, the tip of each of the protrusions 222 that is adjacent to the metal layer may be configured to have a hemispherical structure, each of the protrusions 222 may be generally configured to have a triangular pyramidal structure, or each of the protrusions 222 may be configured to have a linear structure. Preferably, however, the surface of each of the protrusions 222 that contacts the metal layer of the laminate sheet is as large as possible in order to improve heat dissipation efficiency.

The height h2 of each of the protrusions 222 is shown as being the same as the thickness h1 of the inner adhesive layer 203. Alternatively, the height h2 of each of the protrusions 222 may be 100% to 120% of the thickness h1 of the inner adhesive layer 203.

Each of the protrusions 222 protrudes perpendicularly from the plane of the flat type main body 221. The protrusions 222 are located so as to be spaced apart from each other by the same distance.

Consequently, thermal energy from the electrode assembly may move from the outermost electrode to the metal layer of the laminate sheet via the heat transfer member, whereby the thermal energy may uniformly and rapidly move from the entirety of the outermost electrode.

Figure 4:
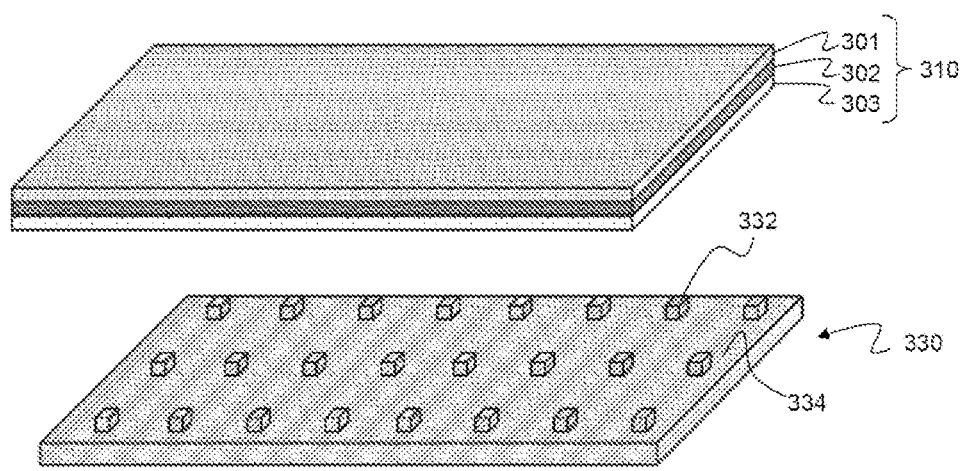
FIG. 4 is a partial exploded perspective view showing a laminate sheet, heat transfer members, and an electrode according to another embodiment of the present invention.
Figure 5:
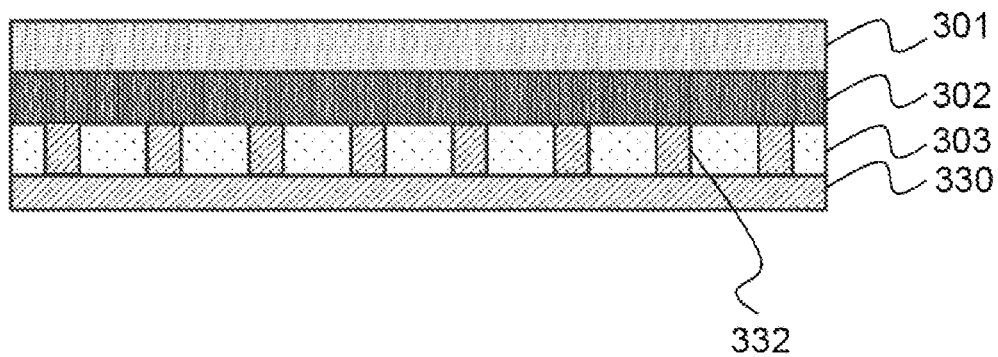
FIG. 5 is a partial side sectional view of the laminate sheet, the heat transfer members, and the electrode shown in FIG. 4.

FIG. 4 is a partial exploded perspective view showing a laminate sheet, heat transfer members, and an electrode according to another embodiment of the present invention, and FIG. 5 is a partial side sectional view schematically showing the laminate sheet, the heat transfer members, and the electrode of FIG. 4.

Referring to FIGS. 4 and 5, the laminate sheet, denoted by reference numeral 310, is configured to have a layered structure in which an outer coating layer 301, a metal layer 302, and an inner adhesive layer 303 are sequentially stacked.

The heat transfer members, denoted by reference numeral 332, are attached to the upper surface of the electrode, denoted by reference numeral 334, so as to protrude perpendicularly from the upper surface of the electrode. In the case in which a combination 330 of the electrode 334 and the heat transfer members 332 is received in a battery case, the heat transfer members 332 contact the metal layer 302 of the laminate sheet 310, which constitutes the battery case, through the inner adhesive layer 303 of the laminate sheet 310.

The shape and the height of each of the heat transfer members 332 may be the same as the shape and the height of each of the protrusions 222 of the heat transfer member 220, and therefore a description thereof will be omitted.

In the case in which the combination of the electrode and the heat transfer members is provided, as described above, it is possible to conveniently manufacture an electrode assembly. Also, in the case in which the heat transfer members 332 are used, it is possible to increase the capacity of a battery in proportion to a decrease in the thickness of the flat type main body of the heat transfer member 220, compared to the case in which the heat transfer member 220 is used.

That is, the pouch-shaped secondary battery according to the present invention is configured to have a structure in which the heat transfer member is provided in the battery case. Consequently, it is possible to easily discharge thermal energy from the secondary battery, whereby it is possible to improve the safety of the secondary battery.

Hereinafter, the present invention will be described with reference to the following examples. These examples are provided only for illustration of the present invention and should not be construed as limiting the scope of the present invention.

Measurement of Thermal Conductivity

Experimental Example

In order to check the difference in thermal conductivity between general conductive adhesives and heat transfer members according to the present invention, seven kinds of conductive adhesive currently available on the market were prepared as Comparative Examples 1 to 7 and five kinds of heat transfer member according to the present invention were prepared as Examples 1 to 5 as described below, and the thermal conductivity of the conductive adhesives and the heat transfer members was measured. The thermal conductivity of the conductive adhesives and the heat transfer members was measured at a temperature of 25° C. using a thermal conductivity measurement instrument (Model TC-30 manufactured by Mathis Company). In addition, the thermal conductivity of the conductive adhesives and the heat transfer members was measured according to ASTM C 518. Meanwhile, it is possible to measure the thermal conductivity of the conductive adhesives and the heat transfer members using an instrument capable of simultaneously measuring the thermal conductivity of solids, liquids, paste, etc., in addition to the above instrument.

The manufacturers of the conductive adhesives and the base materials used in Comparative Examples 1 to 7 are shown in Table 1 below.

TABLE 1

|  | Manufacturer | Base material |
| --- | --- | --- |
| Comparative Example 1 | Aremco | Aluminum |
| Comparative Example 2 | Duralco | Aluminum |
| Comparative Example 3 | Aremco | Silver |
| Comparative Example 4 | Duralco | Silver |
| Comparative Example 5 | Aremco | Nickel |
| Comparative Example 6 | Duralco | Nickel |
| Comparative Example 7 | Duralco | Carbon |

The results of measurement of the thermal conductivity of the heat transfer members according to Examples 1 to 5 and the conductive adhesives according to Comparative Examples 1 to 7 are shown in Table 2 below.

TABLE 2

| Base material |  | Thermal conductivity (W/m · K) |
| --- | --- | --- |
| Aluminum | Example 1 | 235 |
|  | Comparative Example 1 | 1.2 |
|  | Comparative Example 2 | 6.3 |
| Copper | Example 2 | 400 |
| Silver | Example 3 | 430 |
|  | Comparative Example 3 | 9.1 |
|  | Comparative Example 4 | 7.2 |
| Nickel | Example 4 | 91 |
|  | Comparative Example 5 | 2.6 |
|  | Comparative Example 6 | 2.2 |
| Carbon | Example 5 | 140 |
|  | Comparative Example 7 | 8.7 |

Referring to Table 2 above, it can be seen that, even in the case in which the conductive adhesives and the heat transfer members are manufactured using the same base material, the thermal conductivity of the conductive adhesives is much lower than that of the heat transfer members.

For example, when comparing Example 1 and Comparative Example 1, in each of which aluminum was used as the base material, it can be seen that the thermal conductivity of Example 1 is about 196 times as high as that of Comparative Example 1.

In the case in which a pouch-shaped secondary battery is configured to have a structure in which a conductive adhesive is applied to an electrode assembly and a laminate sheet therebetween such that a metal layer of the laminate sheet is connected to the electrode assembly via the conductive adhesive, therefore, it can be seen that it is not easy to rapidly discharge the thermal energy generated in the pouch-shaped secondary battery out of a battery case due to the low thermal conductivity of the conductive adhesive.

Those skilled in the art to which the present invention pertains will appreciate that various applications and modifications are possible based on the above description, without departing from the scope of the present invention.

DESCRIPTION OF REFERENCE NUMERALS

100: Electrode assembly
101: Positive electrode active material
102: Positive electrode current collector
103: Negative electrode active material
104: Negative electrode current collector
110: Separator
201, 301: Outer coating layers
202, 302: Metal layers
203, 303: Inner adhesive layers
210, 310: Laminate sheets
220, 332: Heat transfer members
221: Flat type main body
222: Protrusions
234, 334: Electrodes
330: Combination of electrode and heat transfer member
h1: Thickness of inner adhesive layer
h2: Height of each protrusion

INDUSTRIAL APPLICABILITY

As is apparent from the above description, a pouch-shaped secondary battery according to the present invention is configured to have a structure including a heat transfer member for connecting an electrode assembly mounted in a battery case to a metal layer of a laminate sheet constituting the battery case. Consequently, it is possible to minimize an increase in the overall thickness of the secondary battery and to prevent a decrease in the capacity of a battery cell constituting the secondary battery.

In addition, it is possible to rapidly discharge the thermal energy generated in the secondary battery out of the battery case, whereby it is possible to prevent a thermal runaway phenomenon caused as the result of abnormal use of the secondary battery. Consequently, it is possible to maximally prevent a reduction in the lifespan of the secondary battery due to deterioration of the battery cell, whereby it is possible to provide a secondary battery having improved lifespan characteristics and improved safety.

The invention claimed is:
1. A pouch-shaped secondary battery, comprising:
a laminate sheet comprising an outer coating layer, a metal layer, and an inner adhesive layer;
an electrode assembly;
an electrolytic solution; and a heat transfer member contacting a non-coated surface of an outermost electrode of the electrode assembly and the metal layer of the laminate sheet, the heat transfer member comprising a main body defining a planar surface and a protrusion extending perpendicularly from the planar surface, wherein the outer coating layer and the metal layer of the laminate sheet each extend around the electrode assembly, the electrolytic solution, and the heat transfer member.

2. The pouch-shaped secondary battery according to claim 1, wherein the heat transfer member is attached to the laminate sheet.

3. The pouch-shaped secondary battery according to claim 1, wherein the heat transfer member is made of a metal that exhibits thermal conductivity.

4. The pouch-shaped secondary battery according to claim 1, wherein the heat transfer member is made of at least one selected from a group consisting of: aluminum (Al), copper (Cu), silver (Ag), gold (Au), nickel (Ni), tungsten (W), carbon (C), and iron (Fe).

5. The pouch-shaped secondary battery according to claim 1, wherein the electrode assembly is at least one selected from a group consisting of: a stacked type electrode assembly, a stacked/folded type electrode assembly, and a laminated/stacked type electrode assembly.

6. The pouch-shaped secondary battery according to claim 5, wherein outermost electrode is a first outermost electrode at a first end of the electrode assembly, the electrode assembly has a second outermost electrode at a second end of the electrode assembly opposite the first end, and the first outermost electrode and the second outermost electrode have a same polarity.

7. The pouch-shaped secondary battery according to claim 5, wherein outermost electrodes of the electrode assembly have different polarities.

8. The pouch-shaped secondary battery according to claim 1, wherein the protrusion extends through the inner adhesive layer of the laminate sheet.

9. The pouch-shaped secondary battery according to claim 8, wherein the protrusion comprises a plurality of individual protrusions arranged along the main body of the heat transfer member at uniform intervals.

10. The pouch-shaped secondary battery according to claim 8, wherein a height of the protrusion is 100% to 120% of a thickness of the inner adhesive layer of the laminate sheet.

11. The pouch-shaped secondary battery according to claim 8, wherein the protrusion has a height ranging from 20 μm to 140 μm.

* * * * *